(No Model.)
A. G. COMPTON.
WEEDING IMPLEMENT.
No. 350,186. Patented Oct. 5, 1886.
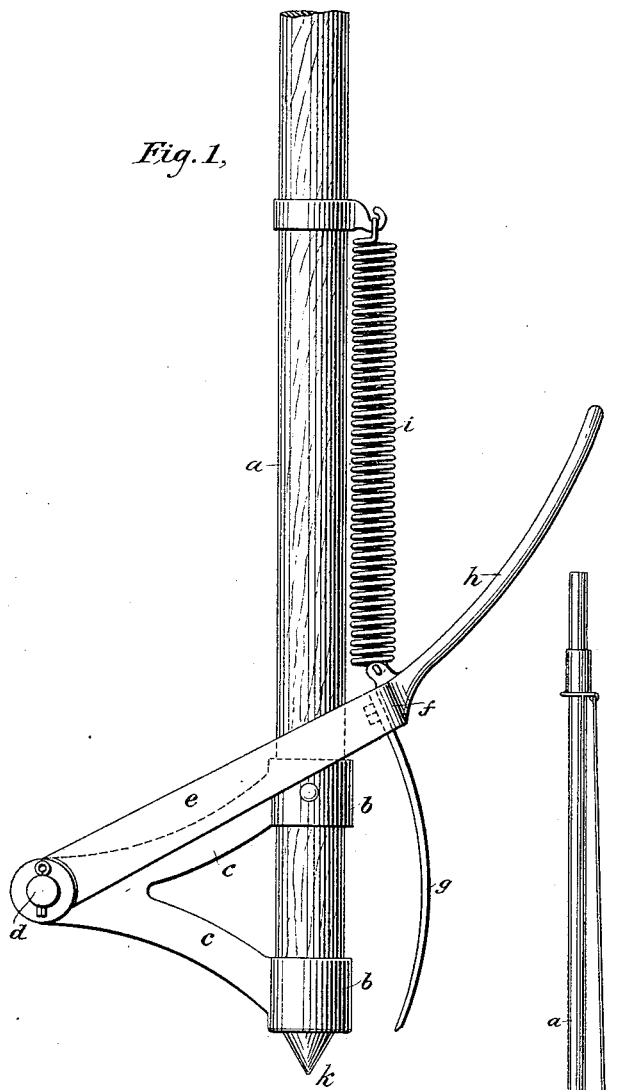
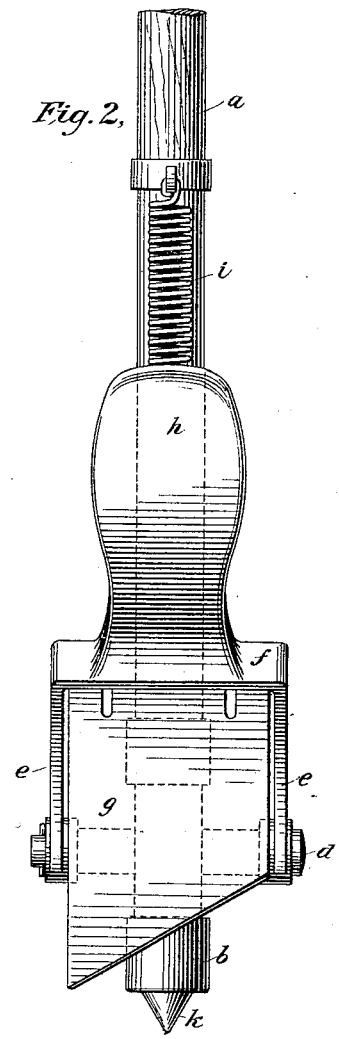
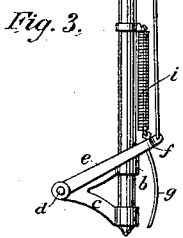
Witnesses
Geo. W. Breck.
Carrie E. Ashley
Inventor
Alfred G. Compton
By his Attorney
W. H. Kenyon

UNITED STATES PATENT OFFICE.

ALFRED G. COMPTON, OF NEW YORK, N. Y.

WEEDING IMPLEMENT.

SPECIFICATION forming part of Letters Patent No. 350,186, dated October 5, 1886.

Application filed June 14, 1886. Serial No. 205,003. (No model.)

*To all whom it may concern:*

Be it known that I, ALFRED G. COMPTON, a citizen of the United States, residing in New York city, in the county and State of New York, have invented a new and useful Machine for Cutting out Weeds from the Ground; and I hereby declare the following to be a full, clear, and exact description of the same, reference being had to the accompanying drawings, and the letters and figures of reference marked thereon, which form a part of this specification.

The object of my invention is to provide a simple, economical, and convenient means for removing weeds—such as plantains—or any objectionable plant or growth from lawns or fields; and it consists of the devices hereinafter shown and described.

In the accompanying drawings, Figure 1 is a side elevation view of my invention, and Fig. 2 is a front elevation of the same.

Similar letters refer to similar parts in the two figures.

$a$ is a rod serving as the handle of the machine, and is made of wood or any suitable material. I prefer to make this handle long enough to enable a person to use the machine without stooping or bending over, and it should be made thick enough to have sufficient strength for the use to which it is put.

$b\ b$ are two metal rings, preferably made of iron, encircling the rod $a$ and fastened to it, one at the lower end of the rod and the other some little distance above the first. From the two rings project the converging arms or braces $c\ c$, uniting at their outer ends and serving to support the bar $d$, which bar is preferably made of iron. The bar $d$ extends horizontally on both sides of the braces $c\ c$ for several inches, or any suitable distance. On the ends of this bar the knife-carrying frame is pivoted. This frame consists of the two arms $e\ e$, pivoted on the ends of the bar $d$, respectively, and the cross-piece $f$ connecting the arms $e\ e$ at their free ends. The arms may be brought within a short distance of each other at their pivoted ends and then bent or curved near their free ends to escape or pass around the rod $a$.

$g$ is the blade of the knife. It projects downward from the cross-piece $f$, to which it is firmly attached, preferably by means of screws or bolts passing through slots in the knife, allowing the knife to be adjusted for any desired purpose, or allowing knives of different sizes to be placed in the machine. The whole blade or knife is curved, as shown. I prefer to make this curvature such as the blade would have if it were part of the wall of a hollow cylinder of which the bar $d$ was the axis. The edge of the knife is preferably slanted or inclined, as shown in Fig. 2, to enable the knife to enter the ground more readily.

$h$ is a foot-piece, and is shaped something like the sole of the foot. This foot-piece is firmly attached to the cross-piece $f$.

In place of the foot-piece there may be used a straight rod pivoted to the cross-piece $f$, and similarly pivoted on a collar or sleeve sliding on the upper part of the rod $a$ and moved by the hand of the operator, as shown in Fig. 3.

$i$ is a spring of considerable strength, and is attached at its upper end to the rod or handle $a$ and at its lower end to the foot-piece $h$ or the cross-piece $f$. The spring is so placed that when in its normal condition it holds the supporting-knife frame with the knife and the foot-piece up from the ground. Any other suitable means of raising the knife may be employed.

$k$ is a spike or pointed or rounded piece of metal or suitable substance, attached to the lower end of the handle $a$ or to the lower ring, $b$, so as to project down in a line with the handle. The lower end of the handle may be sharpened or rounded and thus serve as a spike.

When my machine is used, it is pressed down upon the weed or plant that is to be cut, so that the spike $k$ sinks into the ground far enough to hold the lower end of the handle in position and keep it from slipping. Then the foot-piece $h$ is pressed down by the foot and the knife is thus forced into the ground and cuts through the roots of the weed.

The rings $b\ b$, the braces $c\ c$, and the rod $d$ are preferably made in a single casting, as also are the arms $e\ e$, the cross-piece $f$, and the foot-piece $h$.

What I claim as new, and desire to secure by Letters Patent, is—

1. A weed-cutting machine consisting of a rod or handle having a projecting arm or portion near its lower end, to some part of which projecting arm or portion a knife-carrying frame or lever is pivoted, and a knife attached to said frame or lever, the knife-frame being pivoted at a point sufficiently near the end of the rod to enable the knife to pass freely under the end of the rod and beyond that end for any desired distance, and a spring or other suitable means for raising the knife-carrying frame or lever with the knife, substantially as and for the purposes set forth.

2. A weed-cutting machine consisting of a rod or handle having a projecting arm or portion near its lower end, to some part of which projecting arm or portion a knife-carrying frame or lever is pivoted, and a knife and a foot-piece attached to said frame or lever, the knife-frame being pivoted at a point sufficiently near the end of the rod to enable the knife to pass freely under the end of the rod and beyond that end for any desired distance, and a spring or other suitable means for raising the knife-carrying frame or lever with the knife, substantially as and for the purposes set forth.

3. A machine for cutting out weeds or the like from the ground, consisting of the handle $a$, the metal rings $b\ b$, the braces $c\ c$, the bar $d$, the arms $e\ e$, the cross piece $f$, the knife $g$, the foot-piece $h$, the spring $i$, and the spike $k$, substantially as and for the purposes set forth.

ALFRED G. COMPTON.

Witnesses:
 EDWIN SEGER,
 W. H. KEMPER.